(No Model.)
L. C. TIFFANY.
Glass Tile, Mosaic, &c.
No. 237,416.  Patented Feb. 8, 1881.
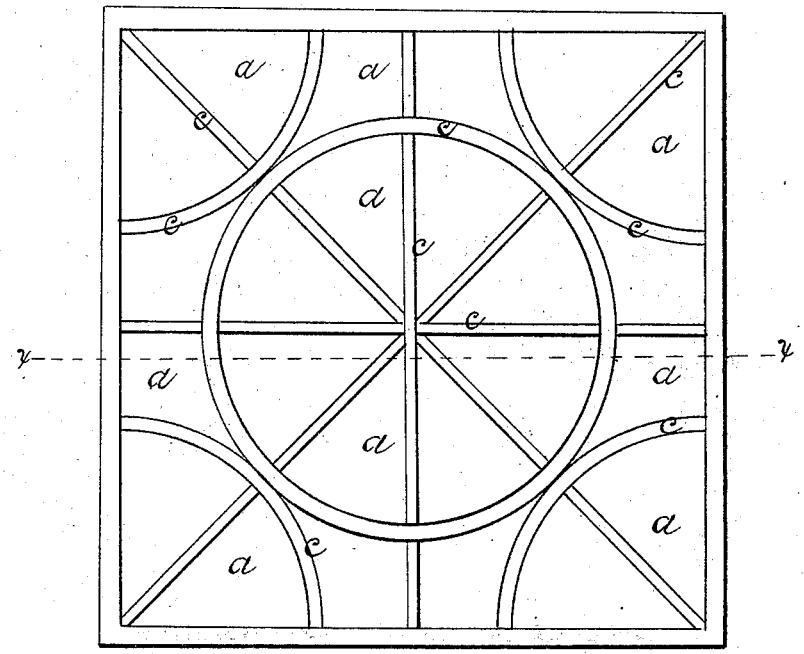
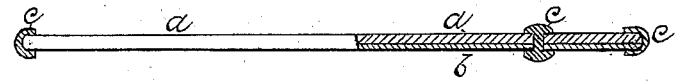
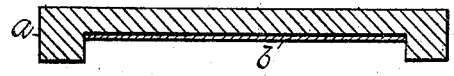
Witnesses:
James H. Hunter.
Elwyn S. Maiiver.
Inventor:
Louis C. Tiffany

UNITED STATES PATENT OFFICE.

LOUIS C. TIFFANY, OF NEW YORK, N. Y.

GLASS TILE, MOSAIC, &c.

SPECIFICATION forming part of Letters Patent No. 237,416, dated February 8, 1881.

Application filed October 25, 1880. (No model.)

*To all whom it may concern:*

Be it known that I, LOUIS C. TIFFANY, a citizen of the United States, residing in the city, county, and State of New York, have invented certain new and useful Improvements in Glass Tiles, Mosaics, &c., of which the following is a specification.

This invention relates to improvements in the combining of certain kinds of glass in tiles, mosaics, &c., thereby obtaining different and more pleasing effects in light and color than have been heretofore produced therein.

It consists in combining with opalescent glass some surface as a background which is reflective of the light back to and through the opalescent glass, or which is wholly or in part absorbent of such light. The effect is greater brilliancy and iridescence in the opalescent glass.

In the drawings, Figure 1 is a mosaic of this opalescent glass combined with a reflective surface. Fig. 2 is a cross-section thereof, taken in the line $xx$ of Fig. 1. Fig. 3 is a tile of the same combined with a similar surface.

In the tile, it may be observed, the opalescent glass is in one piece, while in the mosaic it is in several pieces of different sizes, the reflective or absorbent surface, however, being in both cases the same and in one piece.

$a$ is the opalescent glass. $b$ is the reflective surface behind the opalescent glass, and being in this instance a bright metallic surface. Dark velvet would serve instead in case of an absorbent surface being desired. $c\ c$ are leaded joints. Such joints, however, may be cemented.

If the combination is to be used in a tile instead of a mosaic, no leaded or cemented joints are required, the front and back being each in one piece.

I claim—

The combination, with one or more plates or panes of opalescent glass, of a background or coating of a non-translucent material, whereby the light will be thrown back through or from the opalescent glass, and its iridescence and brilliancy thereby increased.

LOUIS C. TIFFANY.

Witnesses:
JAMES H. HUNTER,
ELWYN S. MAILLER.